United States Patent
Daniels

(10) Patent No.: US 9,341,283 B2
(45) Date of Patent: May 17, 2016

(54) SELF SETTING AND STABILIZED SWITCH TARGET

(71) Applicant: ITT MANUFACTURING ENTERPRISES LLC., Wilmington, DE (US)

(72) Inventor: James R. Daniels, Littiz, PA (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 96 days.

(21) Appl. No.: 14/030,478

(22) Filed: Sep. 18, 2013

(65) Prior Publication Data

US 2015/0075651 A1    Mar. 19, 2015

(51) Int. Cl.
*F16K 37/00* (2006.01)
*B23Q 5/32* (2006.01)

(52) U.S. Cl.
CPC ............ *F16K 37/0041* (2013.01); *B23Q 5/326* (2013.01); *Y10T 137/8242* (2015.04)

(58) Field of Classification Search
CPC ..... F16K 1/52; F16K 1/523; Y10T 137/8225; Y10T 137/8242; Y10T 137/8275
See application file for complete search history.

(56) References Cited

U.S. PATENT DOCUMENTS

| | | |
|---|---|---|
| 3,108,163 A | 10/1963 | Kripke et al. |
| 3,209,090 A | 9/1965 | Fry |
| 3,341,760 A | 9/1967 | Fry |
| 4,164,219 A * | 8/1979 | Bird .................. 128/204.19 |
| 4,316,145 A | 2/1982 | Tann |
| 4,419,646 A | 12/1983 | Hermle |
| 4,712,441 A | 12/1987 | Abraham |
| 4,800,241 A | 1/1989 | McNamara |
| 4,825,228 A | 4/1989 | Gloeckler et al. |
| 4,902,156 A | 2/1990 | Deisler et al. |
| 5,098,666 A | 3/1992 | Meinz |
| 5,522,277 A | 6/1996 | Bollinger |
| 5,522,414 A | 6/1996 | Reeves |
| 5,623,963 A | 4/1997 | Stommes et al. |
| 5,685,336 A * | 11/1997 | Heiniger ................ 137/554 |
| 5,771,926 A | 6/1998 | Medal et al. |
| 5,907,267 A | 5/1999 | Reid et al. |
| 6,097,272 A | 8/2000 | Grover et al. |
| 6,175,290 B1 | 1/2001 | Forsythe et al. |

(Continued)

FOREIGN PATENT DOCUMENTS

| | | |
|---|---|---|
| GB | 1207969 | 10/1970 |
| JP | H02257604 | 3/1989 |

OTHER PUBLICATIONS

H02257604JP—1 page English Language Abstract.

*Primary Examiner* — Matthew W Jellett

(57) ABSTRACT

Apparatus includes a spindle having an outer surface configured with a surface finish that has openings/grooves, the outer surface also having an outer diameter; and also includes a switch target arrangement having a switch target in combination a target ring configured to be installed in the switch target so as to form the at least one switch target arrangement, and is also configured with an aperture having an inner diameter that is smaller than the outer diameter of the surface finish of the spindle, so that when the at least one switch target arrangement is installed over the spindle, interference causes at least a portion of the target ring to deflect into a groove/space of the surface finish of the spindle so as to energize the target ring to grip the surface finish of the spindle to secure the switch target when the spindle moves.

25 Claims, 3 Drawing Sheets

(56) References Cited

U.S. PATENT DOCUMENTS

| | | |
|---|---|---|
| 6,216,913 B1 | 4/2001 | Bilskie et al. |
| 6,642,824 B2 | 11/2003 | Oomkes |
| 6,742,541 B2 * | 6/2004 | Pimouguet ............... 137/554 |
| 7,156,121 B2 * | 1/2007 | Cox et al. .................. 137/554 |
| 7,291,794 B2 | 11/2007 | Woods |
| 7,401,483 B2 | 7/2008 | Dimig et al. |
| 7,489,217 B2 | 2/2009 | Rohrig, III et al. |
| 7,876,186 B2 | 1/2011 | York et al. |
| 7,997,445 B2 | 8/2011 | Thibodeau et al. |
| 8,052,644 B2 | 11/2011 | Radgowski et al. |
| 8,350,649 B2 | 1/2013 | Weirowski-Herz et al. |
| 2002/0057152 A1 | 5/2002 | Elferich et al. |
| 2010/0180811 A1 | 7/2010 | Sotiriou |
| 2010/0196168 A1 | 8/2010 | Kozumplik et al. |
| 2013/0125744 A1 | 5/2013 | Birje et al. |

* cited by examiner

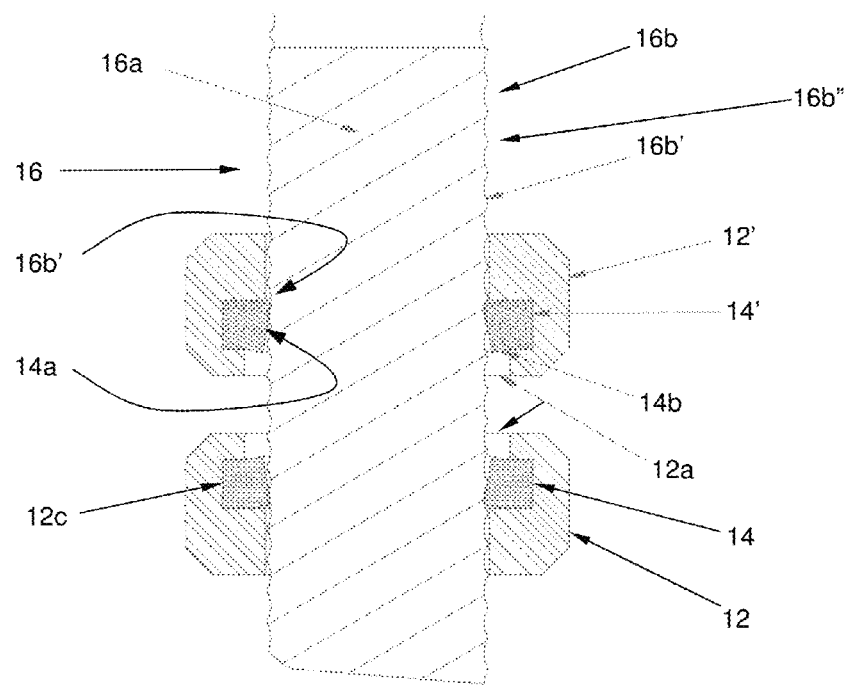
Figure 2: View of Switch Target area

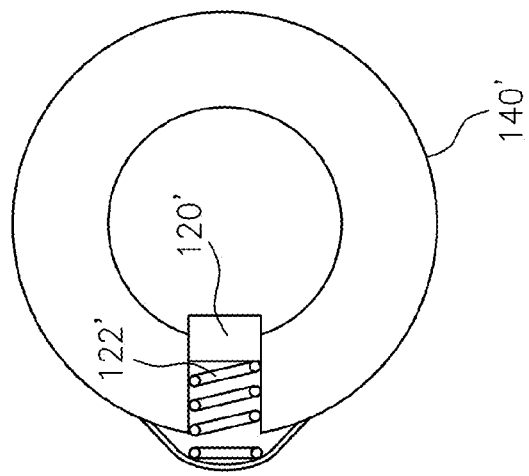
Fig. 3c
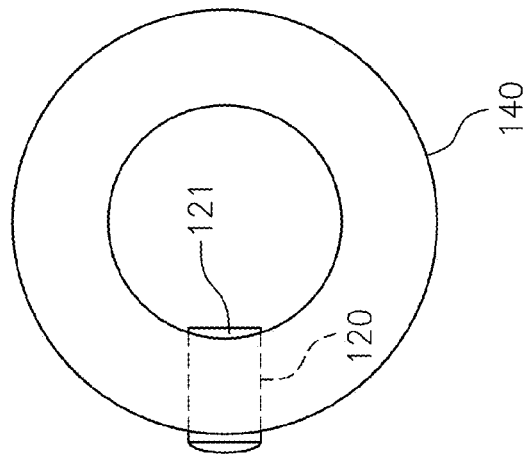
Fig. 3b
Fig. 3
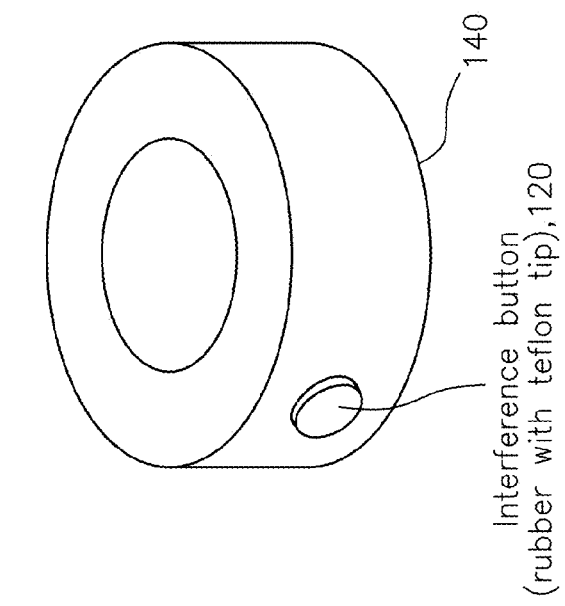
Fig. 3a

SELF SETTING AND STABILIZED SWITCH TARGET

BACKGROUND OF THE INVENTION

1. Field of the Invention

The present invention relates to a technique for configuring a switch target on a spindle; and more particular relates to a technique for configuring a switch target on a spindle to be sensed, e.g., by a switch sensor in a valve.

2. Brief Description of Related Art

Techniques are known in the art for configuring a switch target on a spindle.

One such technique involves crimping the switch target on the spindle. However, one disadvantage of this approach is that it is not self-adjustable or reconfigurable. In other words, in order to provide a reconfiguration, the crimped switch target would need to be uncrimped, reconfigured, and re-crimped; or the crimped switch target would need to be uncrimped, and a new switch target crimped on the spindle at a reconfigured location. Moreover, the crimped switch target technique has shown to have difficulties withstanding vibrations as well as material expansions/shrinking over temperature.

Other techniques may take the form of spot welding or gluing; however, these techniques also do not allow for self-adjusting or reconfiguring. Another known technique may take the form of threading the switch target on the spindle.

In view of this, there is a need in the industry for a better technique for configuring a switch target on a spindle.

SUMMARY OF THE INVENTION

According to some embodiments, the present invention may take the form of apparatus, featuring a spindle in combination with at least one switch target arrangement.

The spindle has an outer surface configured with a surface finish having openings/grooves. The outer surface also has an outer diameter.

The at least one switch target arrangement includes a switch target in combination with a target ring. The target ring is configured to be installed in the switch target so as to form the at least one switch target arrangement, and is also configured with an aperture having an inner diameter that is smaller than the outer diameter of the outer surface of the spindle, so that when the at least one switch target arrangement is installed over the spindle, interference causes at least a portion of the target ring to deflect into at least one groove/space of the surface finish of the spindle so as to energize the target ring to grip the surface finish of the spindle to secure the switch target when the spindle moves.

By way of example, embodiments of the present invention may also include one or more of the following features:

The switch target may be configured or made from metal, or plastic material.

The target ring may be configured or made from Polytetrafluoroethylene (PTFE), nylon, composite, an elastomer or other plastic material.

The surface finish may include, or take the form of, alternating peeks and valleys configured so as to form the grooves/spaces. In other words, the surface finish may be understood to include, or may be configured with, a corrugated outer surface having alternating annular ridges and grooves/spaces formed along its longitudinal axis or spiral lay.

The switch target may be configured with a gap that allows the portion of the target ring to deflect into the at least one groove/space of the surface finish of the spindle.

The switch target may be configured with a circumferential inner channel, and the target ring may be configured to be installed in the circumferential inner channel of the switch target so as to form the at least one switch target arrangement. Alternatively, the switch target may be molded about the target ring so as to form the at least one switch target arrangement.

The switch target may be configured to be detected by a switch sensor when the spindle moves the switch target into a correct sensing position. According to some embodiments of the present invention, the apparatus may include the switch sensor configured to detect the switch target, including where the switch sensor comprises, or takes the form of, a mechanical sensor or a proximity sensor.

The apparatus may include a first bracket stop configured to allow the switch target to stay in a correct sensing position when the spindle is moved into a full downward position, or a second bracket stop configured to allow a second switch target to stay in a second correct sensing position when the spindle is moved into a full upward position, or a combination of the first bracket stop and the second bracket stop.

The target ring may be configured to apply a mechanical gripping force against the spindle so that the at least one switch target arrangement can be axially reconfigured when needed based at least partly on the surface finish of the spindle and the amount of material interference between the spindle and the target ring. The mechanical gripping force is not affected by fictional variations in the materials used or if lubrication is present.

The portion of the target ring may include an inner rim configured to form the aperture and to deflect into the at least one groove/space of the surface finish of the spindle.

The at least one switch target arrangement may include a plurality of switch target arrangements, e.g., including where each switch target arrangement may be installed over the spindle to be sensed by a respective switch sensor when the spindle moves a respective switch target into a respective correct sensing position.

The apparatus may include, or takes the form of a valve, e.g., including a diaphragm valve.

The apparatus may also include an adapter configured to receive the spindle and allow the spindle to move linearly therein; and a housing configured to receive the adapter and contain a switch sensor, where the switch sensor may be configured to sense the switch target when the spindle moves the switch target into a correct sensing position.

According to some embodiments, the present invention may also take the form of a valve, e.g., including a diaphragm valve, featuring a spindle in combination with a switch target arrangement. The spindle may be configured with a corrugated outer surface having alternating axial ridges and grooves/spaces, and also having an outer diameter. The switch target arrangement may include a switch target in combination with a target ring. The target ring may be configured to be installed in the switch target so as to form the at least one switch target arrangement, and may also be configured with an aperture having an inner diameter that is smaller than the outer diameter of the corrugated outer surface of the spindle, so that when the switch target arrangement is installed over the spindle, interference causes a portion of the target ring to deflect into at least one groove/space of the corrugated outer surface of the spindle so as to energize the target ring to grip the corrugated outer surface of the spindle to secure the switch target when the spindle moves. The valve may also include one or more of the features set forth above.

According to some embodiments, the present invention may also take the form of apparatus that includes a spindle having an outer surface configured with a surface finish that has openings/grooves, the outer surface having an outer diameter; and at least one switch target arrangement having a switch target, and an interference member configured to be installed in the switch target so as to form the at least one switch target arrangement, the interference member being configured with at least one portion, so that when the at least one switch target arrangement is installed over the spindle, interference causes the at least one portion of the interference member to engage into at least one groove/space of the surface finish of the spindle so as to grip the surface finish of the spindle to secure the switch target when the spindle moves.

One advantage of the present invention is that the grip load can be configured to allow better stability against vibration and temperature changes.

Another advantage of the present invention is that this design with the energized target ring will have a higher coefficient of static friction while still allowing the switch target arrangement to reconfigure its position when needed.

BRIEF DESCRIPTION OF THE DRAWING

The drawing includes the following Figures, not necessarily drawn to scale:

FIG. 2 is an exploded view of part of the switch target area that forms part of the apparatus shown in FIG. 1.

FIG. 3 includes FIGS. 3a to 3c and shows other configuration for a ring target design according to some embodiments of the present invention.

Figure 1:
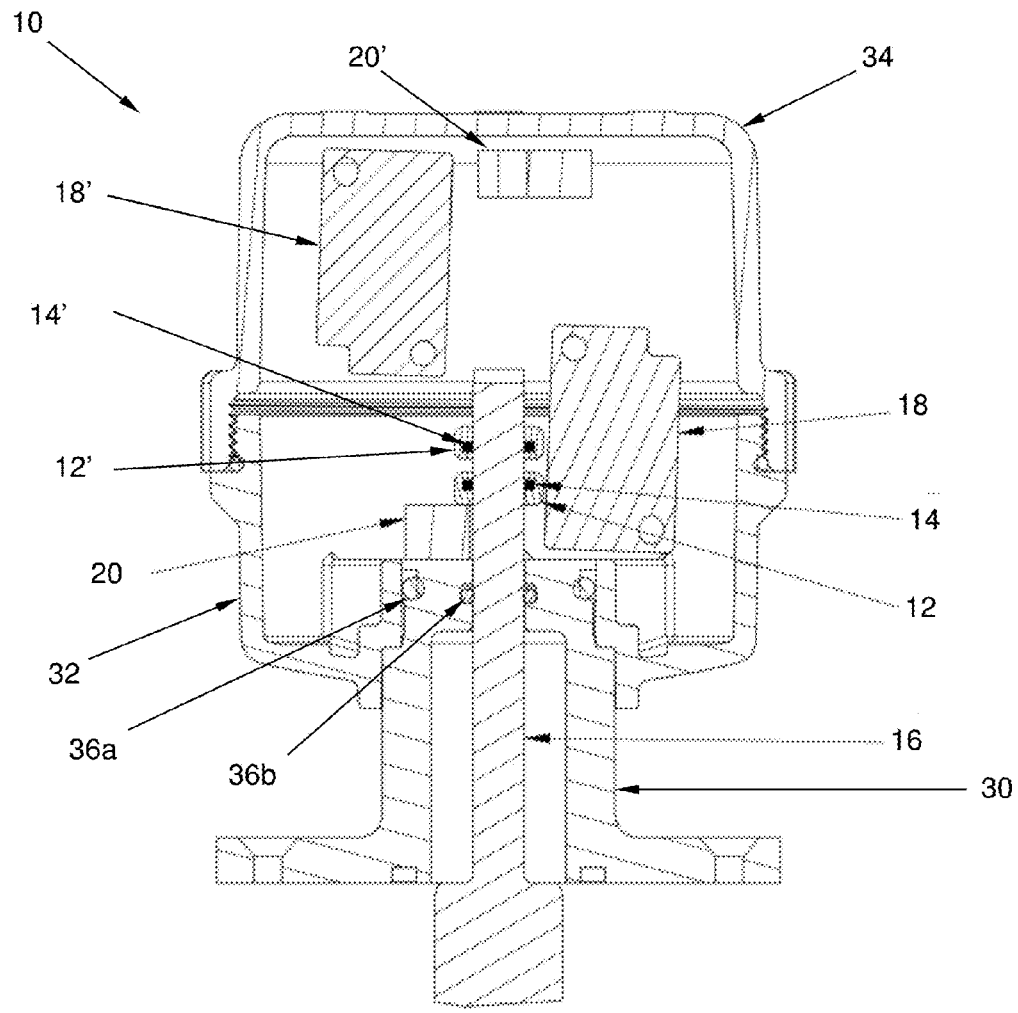
FIG. 1 is a cross-sectional view of apparatus according to some embodiments of the present invention.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

FIG. 1 shows the present invention in the form of apparatus generally indicated as 10, e.g., having a switch target arrangement that includes a switch target 12, 12' in combination with a target ring 14, 14' located on a spindle 16. In operation, a switch sensor 18, 18' is configured to detect respectively the switch target 12, 12' when each is moved into a respective sensing position. The target ring 14, 14' is configured to grip the outer surface 16a (see FIG. 2) of the the spindle 16 to secure the switch target 12, 12' when the spindle 16 moves up and down. A bracket stop 20, 20' is configured to allow the switch target 12, 12' to stay in a correct sensing position when the spindle 16 is in a full downward position or a full upward position. The gripping force that the target ring 14, 14' has against the spindle 16 can be reconfigured based on a surface finish or profile 16b (see FIG. 2) of the spindle 16 and by reconfiguring the amount of material interference between the spindle 16 and the target ring 14, 14'.

FIG. 2 shows the switch target 12, 12' with the target ring 14, 14' in its installed and energized position. The target ring 14, 14' is initially installed into the switch target 12, 12' before it is installed over the spindle 16. The inner diameter (ID) of the target ring 14, 14' is configured smaller than the outer diameter (OD) of the spindle 16. When the switch target 12, 12' and the target ring 14, 14' are installed together over the spindle 16, the interference causes the target ring 14, 14' to deflect, causes at least a portion 14a of the target ring 14 to deflect into at least one space/groove 16b' of the surface finish or profile 16b (see the left side of the spindle 16 in FIG. 2), and causes another portion 14b of the target ring 14 to deflect into a gap 12a formed in the switch target 12 (see the right side of the spindle 16 in FIG. 2). This deflection causes the target ring 14, 14' to be energized to grip onto the spindle 16. This grip or gripping action between the target ring 14, 14' and the outer surface 16a of the spindle 16 can be further enhanced to reduce the effects of vibrations, based at least partly on providing the surface finish or profile 16b' on the OD surface of spindle 16.

Additional Features, Parts or Elements of the Apparatus 10

The following additional features, parts or elements of the apparatus 10 are provided by way of example:

The switch target 12, 12' may be configured from an elastomer or plastic material, although the scope of the invention is intended to include using other types or kinds of materials having substantially similar properties as an elastomer or plastic material that are either now known or later developed in the future.

The target ring 14, 14' may be configured from Polytetrafluoroethylene (PTFE), also known as Teflon™, or nylon, although the scope of the invention is intended to include using other types or kinds of materials having substantially similar properties as PTFE or nylon that are either now known or later developed in the future.

The surface finish or profile 16b may include, or take the form of, alternating peeks 16b" and valleys 16b' (also known herein as the grooves/spaces 16b'). In other words, the surface finish or profile 16b may be understood to be configured with a corrugated outer surface having alternating annular ridges and grooves/spaces formed along its longitudinal axis. The scope of the invention is not intended to be limited to any particular type or kind of surface finish or profile 16b, and embodiments are envisioned using other types or kind of configurations for the surface finish or profile within the spirit of the present invention.

The switch target 12, 12' may be configured with the gap 12a that allows the at least one portion 14a of the target ring 14 to deflect into the at least one groove/space 16b' of the surface finish or profile 16b of the spindle 16, as best shown in FIG. 2. The scope of the invention is intended to include embodiments both with and without such a gap within the spirit of the present invention.

The switch target 12, 12' may be configured with a circumferential inner channel 12c, and the target ring 14, 14' may be configured to be installed in the circumferential inner channel 12c of the switch target 12, 12' so as to form the at least one switch target arrangement. Alternatively, the switch target 12, 12' may be molded about the target ring 14, 14' so as to form the at least one switch target arrangement. The scope of the invention is also intended to include other types or kinds of arrangements and configuration between the switch target 12 and the target ring 14 within the spirit of the present invention.

The switch target 12, 12' may be configured to be detected by a switch sensor like element 18, 18' shown in FIG. 1 when the spindle 16 moves the switch target 12, 12' into a correct sensing position. According to some embodiment of the present invention, the apparatus 10 may include the switch sensor 18, 18' configured to detect the switch target 12, 12', including where the switch sensor comprises, or takes the form of, a mechanical sensor or a proximity sensor. Mechanical sensors or proximity sensors are known in the art, and the scope of the invention is not intended to be limited to any particular type or kind thereof, either now known or later developed in the future. In operation, the switch target 12, 12' may be used to activate such a mechanical or proximity switch, e.g., including being used as a switch target in a valve, e.g., including a diaphragm valve. The at least one switch target arrangement may include a plurality of switch target arrangements, as shown in FIGS. 1-2, including where each switch target arrangement is installed over the spindle 16 to be sensed by a respective switch sensor 18, 18' when the spindle 16 moves a respective switch target 12, 12' into a respective correct sensing position. In FIG. 1, the switch sensor 18 is configured to sense the switch target 12, and the switch sensor 18' is configured to sense the switch target 12', as shown.

The portion 14a of the target ring 14, 14' may include, or be form in whole or in part as, e.g., an inner rim that is configured to form the aperture of the target ring 14, 14' and to deflect into the at least one groove/space 16b' of the surface finish or profile 16b of the spindle 16.

The apparatus 10 may also include an adapter configured to receive the spindle 16 and allow the spindle 16 to move or slide linearly therein; and a housing 32 configured to receive the adapter 30 and contain the switch sensor 18, 18', where the switch sensor 18, 18' is configured to sense the switch target 12, 12' when the spindle 16 moves the switch target 12, 12' into the correct sensing position.

In FIG. 1, the apparatus 10 may also include other parts, components or elements that do not form part of the underlying invention and are not described in detail, e.g., including a cover 34, O-rings 36a, 36b, etc.

Moreover, the scope of the invention is not intended to be limited to the manner or way in which the spindle 16 is induced to move, e.g., linearly, including movement caused by some mechanical, or electromechanical, or electromagnetic, or thermal inducement, etc.

FIG. 3

The scope of the invention is not intended to be limited to elements 12, 12' being configured in the form of a ring. For example, embodiments are envisioned in which elements 12, 12' take the form of, or are configured as, an interference member, including a post or plug, that is configured inside the switch target. Alternatively, the ring or interference member may also be configured to be energized by a spring to apply a load to the spindle.

By way of example, FIGS. 3a and 3b show a switch target 140 having an orifice formed therein configured with an interference button 120 having a tip 121, e.g., made of Teflon®.

By way of further example, FIG. 3c shows a switch target 140' also having an orifice formed therein configured with an interference button 120' and a spring 122'.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. Apparatus comprising:
    a housing having at least one switch sensor contained therein;
    a spindle having an outer surface configured with a surface finish that has alternating annular ridges and grooves/spaces formed along its longitudinal axis, the outer surface having an outer diameter; and
    at least one switch target arrangement comprised of:
        a switch target, and
        a target ring configured or installed in the switch target to form the at least one switch target arrangement, and also configured with an aperture having an inner diameter that is smaller than the outer diameter of the outer surface of the spindle, the switch target with the target ring installed together over the spindle in an energized position, where an interference between the target ring and the spindle causes at least a portion of the target ring to deflect into at least one groove/space of the surface finish of the spindle and energize the target ring to grip the surface finish of the spindle to secure the at least one switch target arrangement to the spindle, the switch sensor configured to sense the switch target installed on the spindle in the energized position.

2. Apparatus according to claim 1, wherein the switch target is configured from a metal or plastic material.

3. Apparatus according to claim 1, wherein the target ring is configured from Polytetrafluoroethylene (PTFE), nylon, composite, an elastomer or other plastic material.

4. Apparatus according to claim 1, wherein the surface finish comprises alternating peeks and valleys configured to form the alternating annular ridges and grooves/spaces.

5. Apparatus according to claim 1, wherein the switch target is configured with a gap that allows the portion of the target ring to deflect into the at least one groove/space of the surface finish of the spindle.

6. Apparatus according to claim 1, wherein the switch target is configured with a circumferential inner channel, and the target ring is configured or installed in the circumferential inner channel of the switch target to form the at least one switch target arrangement.

7. Apparatus according to claim 1, wherein the switch target is molded about the target ring so as to form the at least one switch target arrangement.

8. Apparatus according to claim 1, wherein the spindle moves up and down between a full downward position and a full upward position.

9. Apparatus according to claim 8, wherein the switch sensor comprises a mechanical sensor or a proximity sensor.

10. Apparatus according to claim 1, wherein the apparatus comprises a first bracket stop configured to allow the switch target to stay in a correct sensing position, or a second bracket stop configured to allow a second switch target to stay in a second correct sensing position.

11. Apparatus according to claim 1, wherein the target ring is configured to apply a mechanical gripping force against the spindle so that the at least one switch target arrangement can be axially reconfigured or repositioned based at least partly on the surface finish of the spindle and the amount of material interference between the spindle and the target ring.

12. Apparatus according to claim 1, wherein the surface finish is configured with a corrugated outer surface having alternating annular ridges and grooves/spaces formed along its longitudinal axis.

13. Apparatus according to claim 1, wherein the portion of the target ring comprises an inner rim configured to form the aperture and to deflect into the at least one groove/space of the surface finish of the spindle.

14. Apparatus according to claim 1, wherein the at least one switch target arrangement comprises a plurality of switch target arrangements, each switch target arrangement being installed over the spindle to be sensed by a respective switch sensor.

15. Apparatus according to claim 1, wherein the apparatus comprises a valve, including a diaphragm valve.

16. Apparatus according to claim 1, wherein
the apparatus comprises an adapter configured to receive the spindle and allow the spindle to move linearly therein;
the housing is configured to receive the adapter; and
the switch sensor is configured to sense the switch target.

17. A valve comprising:
a housing having at least one switch sensor contained therein;
a spindle configured with a corrugated outer surface having alternating annular ridges and grooves/spaces formed along its longitudinal axis and also having an outer diameter; and
a switch target arrangement comprised of:
a switch target, and
a target ring configured or installed in the switch target to form the at least one switch target arrangement, and also configured with an aperture having an inner diameter that is smaller than the outer diameter of the corrugated outer surface of the spindle, the switch target with the target ring installed together over the spindle in an energized position, where an interference between the target ring and the spindle causes a portion of the target ring to deflect into at least one groove/space of the corrugated outer surface of the spindle and energize the target ring to grip the corrugated outer surface of the spindle to secure the at least one switch target arrangement to the spindle, the switch sensor configured to sense the switch target installed on the spindle in the energized position.

18. A valve according to claim 17, wherein the switch target is configured from a metal or plastic material.

19. A valve according to claim 17, wherein the target ring is configured from Polytetrafluoroethylene (PTFE) or nylon.

20. A valve according to claim 17, wherein the switch target is configured with a gap that allows the target ring to deflect into the at least one groove/space of the corrugated outer surface of the spindle.

21. Apparatus comprising:
a housing having at least one switch sensor contained therein;
a spindle having an outer surface configured with a surface finish that has alternating annular ridges and grooves/spaces formed along its longitudinal axis, the outer surface having an outer diameter; and
at least one switch target arrangement comprised of:
a switch target, and
an interference member configured in the switch target to form the at least one switch target arrangement, the interference member being configured with at least one portion, the switch target with the target ring installed together over the spindle in an energized position, where an interference between the interference member and the spindle causes the at least one portion of the interference member to engage into at least one groove/space of the surface finish of the spindle and grip the surface finish of the spindle to secure the at least one switch target arrangement to the spindle, the switch sensor configured to sense the switch target installed on the spindle in the energized position.

22. Apparatus according to claim 21, wherein the switch target is configured from a metal or plastic material.

23. Apparatus according to claim 21, wherein the interference member is configured from Polytetrafluoroethylene (PTFE), nylon, composite, an elastomer or other plastic material.

24. Apparatus according to claim 21, wherein the surface finish comprises alternating peeks and valleys configured to form the alternating annular ridges and grooves/spaces.

25. Apparatus according to claim 17, wherein the corrugated outer surface comprises alternating peeks and valleys configured to form the alternating annular ridges and grooves/spaces.

* * * * *